United States Patent
Lowell

(10) Patent No.: US 7,153,065 B2
(45) Date of Patent: Dec. 26, 2006

(54) MULTI-STAGE AIR PRESSURE APPARATUS AND A BI-DIRECTIONAL PNEUMATIC CONVEYANCE SYSTEM INCORPORATING SUCH APPARATUS

(75) Inventor: Scott Lowell, Burlington, KY (US)

(73) Assignee: Hamilton Safe Company, Fairfield, OH (US)

( * ) Notice: Subject to any disclaimer, the term of this patent is extended or adjusted under 35 U.S.C. 154(b) by 946 days.

(21) Appl. No.: 10/245,717

(22) Filed: Sep. 18, 2002

(65) Prior Publication Data

US 2003/0103816 A1  Jun. 5, 2003

Related U.S. Application Data

(60) Provisional application No. 60/335,793, filed on Dec. 5, 2001.

(51) Int. Cl.
*B65G 51/26* (2006.01)
(52) U.S. Cl. ................. 406/110; 406/13; 406/93; 406/151; 406/176
(58) Field of Classification Search ................. 406/13, 406/16, 26, 93, 110, 111, 112, 151
See application file for complete search history.

(56) References Cited

U.S. PATENT DOCUMENTS

| | | | |
|---|---|---|---|
| 3,711,038 A * | 1/1973 | Van Otteran ............ | 406/19 |
| 3,738,592 A * | 6/1973 | Smith et al. ............ | 406/19 |
| 5,147,154 A * | 9/1992 | Scott ..................... | 406/112 |
| 5,211,513 A * | 5/1993 | Scott ..................... | 406/112 |
| 5,562,367 A | 10/1996 | Scott | |
| 5,584,613 A * | 12/1996 | Greene et al. ........... | 406/19 |
| 5,984,509 A | 11/1999 | Scott | |
| 6,019,247 A | 2/2000 | Scott | |
| 6,039,510 A * | 3/2000 | Greene et al. ........... | 406/21 |
| 6,202,006 B1 | 3/2001 | Scott | |
| 6,592,302 B1 * | 7/2003 | Balko .................... | 406/97 |
| 6,652,198 B1 * | 11/2003 | Nickoson ................ | 406/13 |
| 6,726,457 B1 * | 4/2004 | Wenzel .................. | 417/364 |

\* cited by examiner

*Primary Examiner*—Joe Dillon, Jr.
(74) *Attorney, Agent, or Firm*—Smith, Gambrell & Russell, LLP

(57) ABSTRACT

A multi-stage pressure/vacuum apparatus is disclosed for a bi-directional pneumatic delivery system or the like. The apparatus includes separated turbines or separated sets of turbines that are operated independently of each other to alternatively create pressure and vacuum conditions for an external system such as a pneumatic delivery network relying upon the inventive apparatus for pressure and/or vacuum generation. A common housing contains both turbine sets and defines a system of internal chambers and valve mechanisms between them. The valve mechanisms respond to internal pressures created within the housing by the turbines, and preferably also to gravity in order to control air flow patterns through the housing and between the housing and an external system. According to the present invention, the turbines of the two turbine sets can be operated concurrently at maximum capacity or separately if air power requirements are lesser. The present invention also contemplates a method of creating pressure or vacuum conditions with the inventive apparatus disclosed. The present invention further contemplates a bi-directional pneumatic delivery system including the multi-stage pressure apparatus disclosed.

15 Claims, 6 Drawing Sheets

MULTI-STAGE AIR PRESSURE APPARATUS AND A BI-DIRECTIONAL PNEUMATIC CONVEYANCE SYSTEM INCORPORATING SUCH APPARATUS

This application claims the benefit of earlier filed U.S. provisional application No. 60/335,793 filed Dec. 5, 2001 under 35 U.S.C. §119(e).

BACKGROUND OF THE INVENTION

The present invention relates to a multi-stage pressure apparatus ideally suited for creating pressure and vacuum conditions in a bi-directional pneumatic conveyance system such as the one generally disclosed in U.S. Pat. No. 5,562,367, the disclosure of which is incorporated herein in its entirety. More particularly, the present invention relates to a multi-stage pressure apparatus including independently operable pressure generation units and internal chambers and valve mechanisms to selectively create pressure or vacuum conditions in response to mere activation of the pressure generation units. The present invention also relates to a method of pressure or vacuum generation with such a multi-stage apparatus, and an actual bi-directional pneumatic conveyance system incorporating such an apparatus.

SUMMARY OF THE INVENTION

The present invention provides a simplified apparatus ideally suited for pressure and/or vacuum generation in a system such as a bi-directional pneumatic conveyor. Indeed, the present invention contemplates a bi-directional pneumatic conveyance system including the inventive multi-stage air pressure generator disclosed herein. The multi-stage air pressure apparatus according to the invention can be contained in a generally rectangular outer housing for relative ease in manufacturing and subsequent maintenance. The pressure generation apparatus is described as "multi-stage" because it generates maximum pressure in stages (two stages according to the preferred embodiment), and also maximum vacuum conditions in stages (three stages in the preferred embodiment).

The multi-stage pressure apparatus includes a housing with internal chambers and ports between a first turbine chamber that contains at least one turbine and a second turbine chamber than contains at least one other turbine. The turbines of each chamber can be activated independently of each other, at slightly different times. The chambers and their ports within the housing selectively are opened and closed by valve elements that respond to pressures created within the chambers by the turbines, and in the preferred embodiments, that also respond to gravity. The valve elements include biased valves, unbiased valves and, in the preferred embodiment, particularly configured spool valves.

Within the housing, a common pressure chamber selectively can be placed in communication with either or both of the turbine chambers to conduct pressurized air from the discharge or pressure side of the turbines. The common pressure chamber also selectively can be placed in communication with either an external connection chamber adapted for interface with an external system such as a bi-directional pneumatic conveyor, or an intake/exhaust chamber that is in communication with the outside atmosphere through an intake/exhaust port.

In the preferred embodiment of the present invention, mere activation of the turbines according to predetermined sequences, and the affect of gravity on certain of the valve elements, controls whether the multi-stage pressure apparatus will create pressure or vacuum conditions at the external connection chamber and hence in an interfaced external system. Indeed, according to the preferred embodiment, it merely is a matter of whether the turbine or turbines on one side of the common pressure chamber or the turbine or turbines on the other side of the common pressure chamber is/are activated first. Maximum vacuum and pressure conditions are created when all turbines are active. If for some reason, however, less than maximum pressure or vacuum conditions are desired, the apparatus can be operated with less than all turbines active.

During multi-stage vacuum generation, two different and distinct air flow paths or patterns are formed within the apparatus housing. Air intake for activated turbines on one side of the common pressure chamber initially is provided by an intake/exhaust port that is in permanent communication with the outside atmosphere. In the first vacuum creation stage, there is no movement of air from out of the common pressure chamber and so a relatively large pressure builds therein. This pressure build-up changes the position of certain valve elements that are responsive to pressure in order to automatically reconfigure the apparatus internally so that intake air for the active turbines begins to be drawn in from external of the apparatus through the external connection chamber, and at the same time, the intake/exhaust port instead begins to vent air discharged from the active turbines. Establishment of this first flow path from the external connection chamber to the intake/exhaust chamber now serving as a vent for outgoing air, creates vacuum conditions at the external connection chamber. Once this first vacuum flow path becomes established, the turbines on the other side of the common pressure chamber can be activated to provide a second air flow pattern that merges with the first to thereby maximize vacuum conditions the exhaust connection chamber and therefore the interfaced external system.

Pressure generation by the inventive multi-stage apparatus is simpler than vacuum generation and involves a first air flow path from the intake/exhaust chamber to activated turbines, through the common pressure chamber and out through the external connection chamber. In the case of pressure generation, turbines other than the one activated to initiate vacuum creation are activated. Once a first pressure flow path has been established by the active turbines, the other side turbine or turbines can be activated to increase air flow from the intake/exhaust chamber to the external connection chamber to correspondingly increase (maximize) the pressure at the external connection chamber.

It will be appreciated that multiple capacities accomplished by the present apparatus allow the apparatus to function effectively and efficiently when it is utilized with different item carrier networks or the like in different environments. For example, when the inventive multi-stage apparatus operates to supply air in a large tube network, as say in a bank teller network, pressure losses may be greater than for a less complicated or smaller network. In the former case, a relatively larger pressure supply capacity might be required. By contrast, in the latter case, the present invention may supply air using a pressure stage which generates pressure at a smaller capacity to more efficiently supply the pressure needs of a particular tube network. In addition to networks of different sizes, some item conveyance tasks or sets of tasks might require more or less pressure or vacuum supply capacity. For example, a tube network may require one pressure level for conveyance to cash registers at the front of, for example, a warehouse. A different supply may be necessary to adequately supply pressurized air to transport an item between different parts of the warehouse. The present apparatus' unique capabilities may be controlled to most efficiently accomplish varied operational requirements.

Furthermore, maintenance on the multi-stage apparatus according to the present invention can be simplified. This is because, for example, in the preferred embodiment, the valve elements which regulate air flow between the chambers are responsive simply to internal pressures and gravity. Hence, the preferred embodiment calls for check valves that are weighted or otherwise biased appropriately to open only after a certain internal pressure overcomes the bias weight. Likewise, the preferred embodiment calls for spool valves that move to open or close chambers and control appropriate flow paths when internal pressures and/or gravity act on the spool valves. The inventive apparatus, in its simplest form, then, has no need for a more complicated control system, for example, to sense internal pressures electronically for instance, and then control the position of the valve elements accordingly. Because the valve elements can be actuated simply by pressure or gravity, such elements can be relatively uncomplicated weighted and/or hinged elements. As a result, maintenance is much easier due to the presence of simple mechanical elements. One of ordinary skill, however, would find it obvious to substitute more complicated elements such as pneumatic/electronic control valves, if desired.

BRIEF DESCRIPTION OF THE DRAWINGS

Further aspects and features of the present invention will be even more apparent from the detailed description and drawings, and the appended claims. In the drawings:

DETAILED DESCRIPTION OF THE PREFERRED EMBODIMENT

Figure 1:
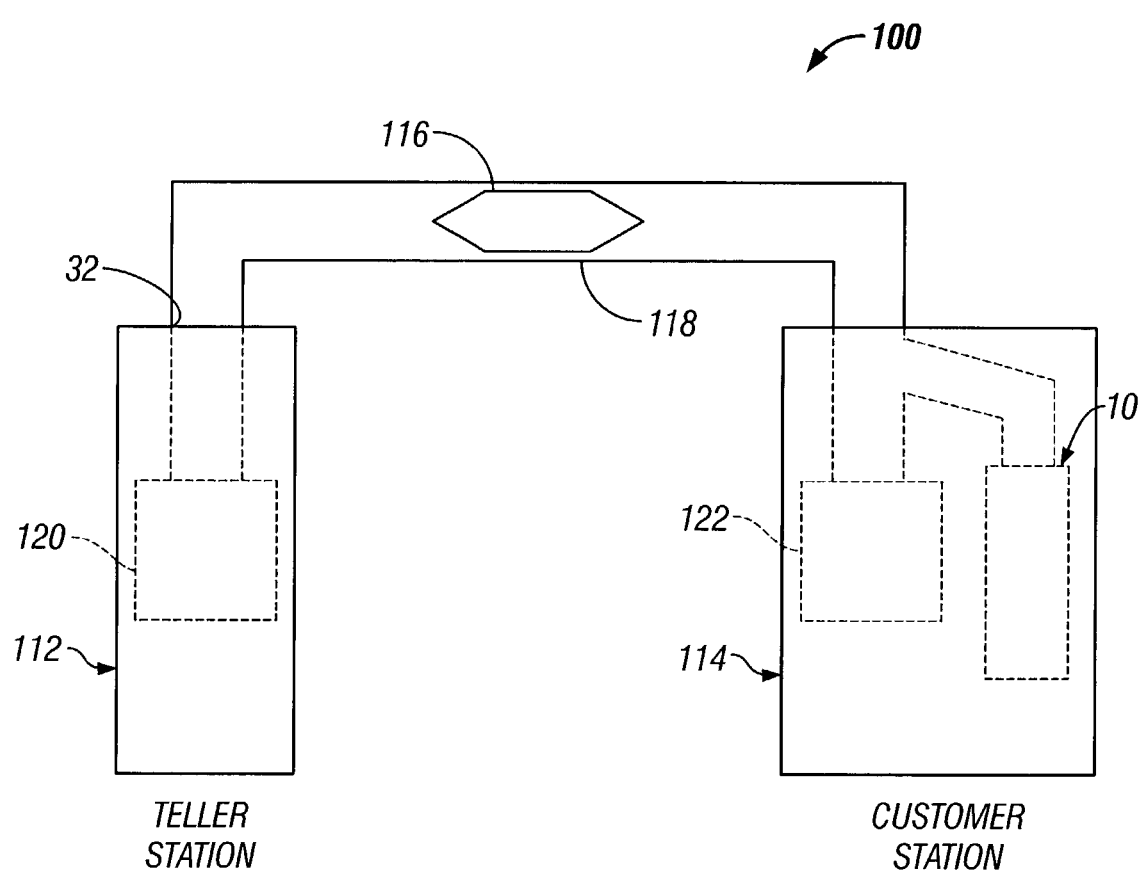
FIG. 1 is a schematic diagram of a bank teller carrier system incorporating the multi-stage pressure supply apparatus of the present invention.

FIG. 1 schematically depicts a bi-directional pneumatic transportation system 100 in which the multi-stage pressure apparatus 10 according to the present invention is incorporated. Pneumatic transportation system 100 ideally is suited for use in the form of a bank teller network including, for example, a teller station 112, typically within the bank and a customer station 114 remote from the bank main building. Communication between the teller and customer is provided by a carrier 116 depicted as transported by pressure and vacuum conditions created within a carrier tube network 118. Carrier 116 is transported between respective carrier reception areas 120 at the teller station 112 and 122 at the customer station 114. While multi-stage pressure apparatus 10 is disclosed as providing the vacuum and/or pressure engine for system 100, it should be considered that apparatus 10 can have application in any like application requiring controlled pneumatic pressure and vacuum creation.

Figure 2:
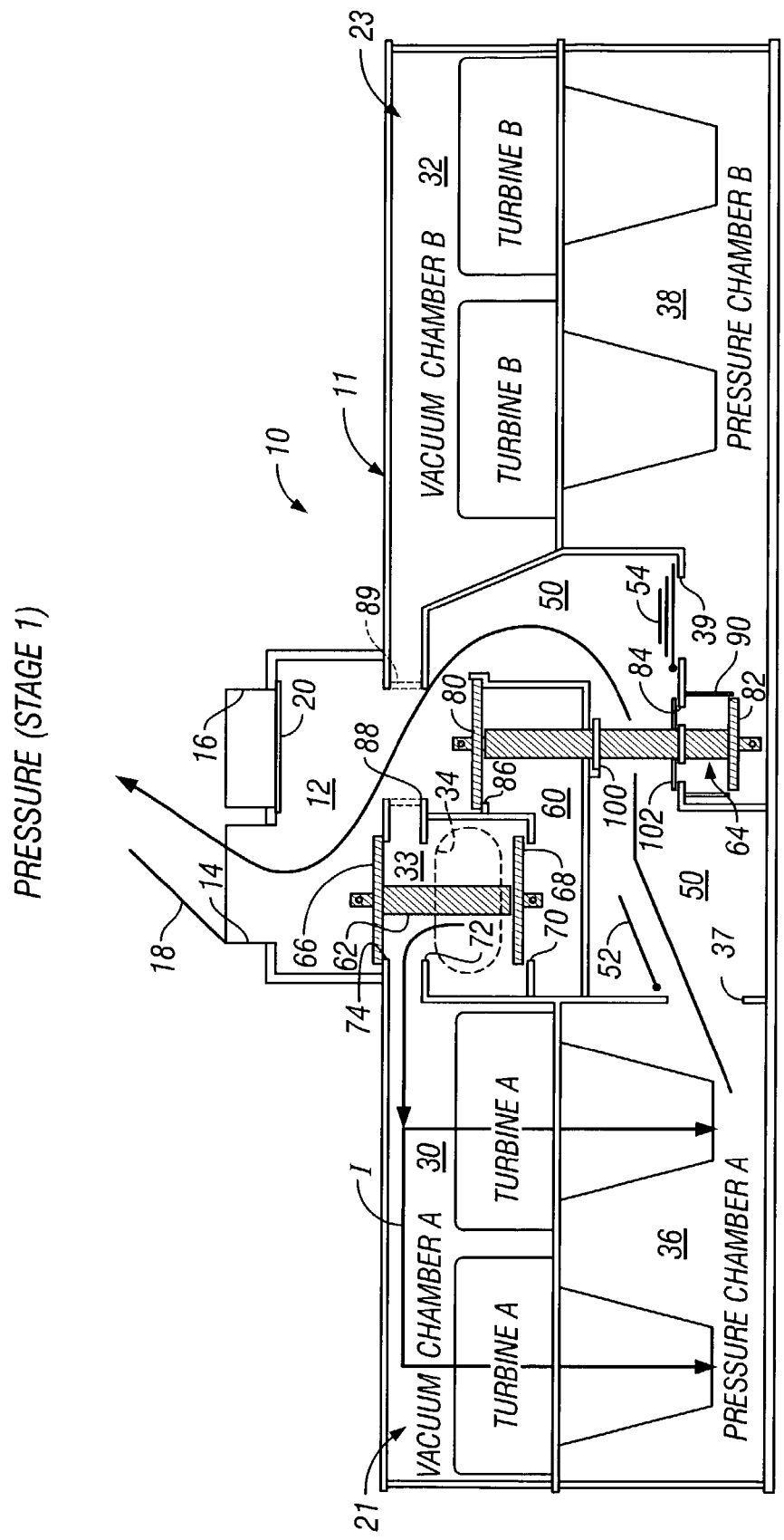
FIG. 2 is a schematic side view focusing on interior structure and operation of a preferred embodiment of the multi-stage pressure supply apparatus of the present invention, in a first pressurization stage.
Figure 3:
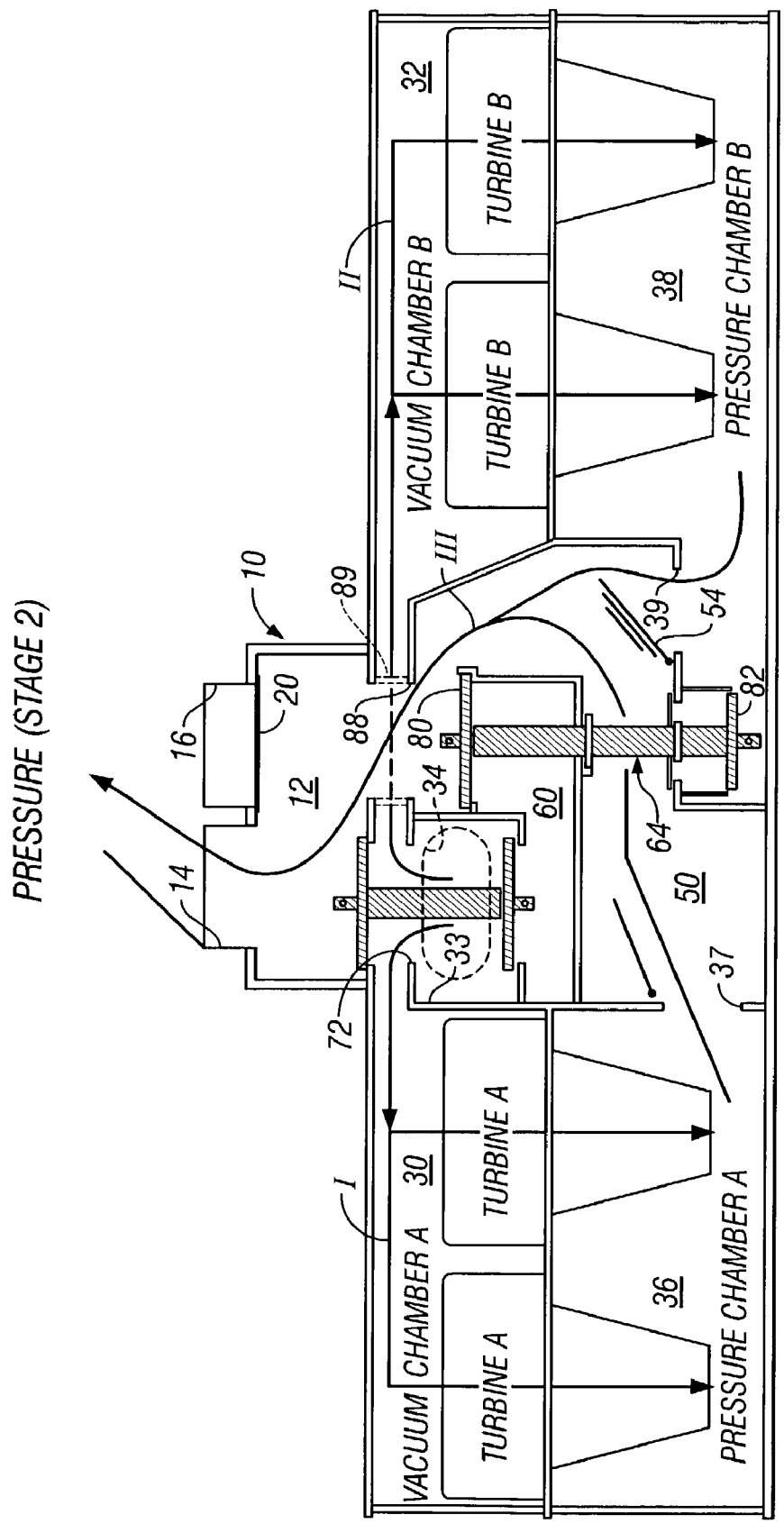
FIG. 3 is a schematic side view, similar to FIG. 2, of the multi-stage pressure supply apparatus in a second pressurization stage.
Figure 4:
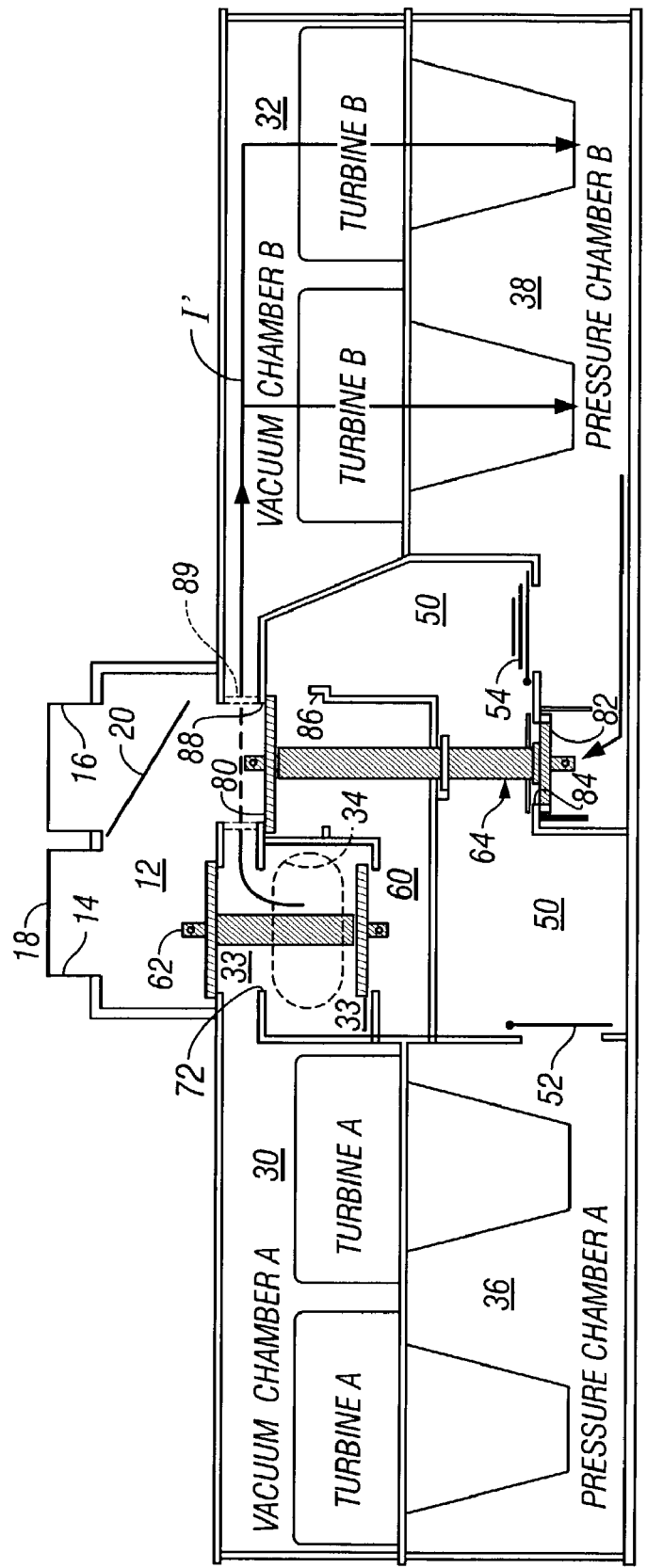
FIG. 4 is a schematic side view, similar to FIG. 2, of the multi-stage pressure supply apparatus in a first vacuum forming stage.
Figure 5:
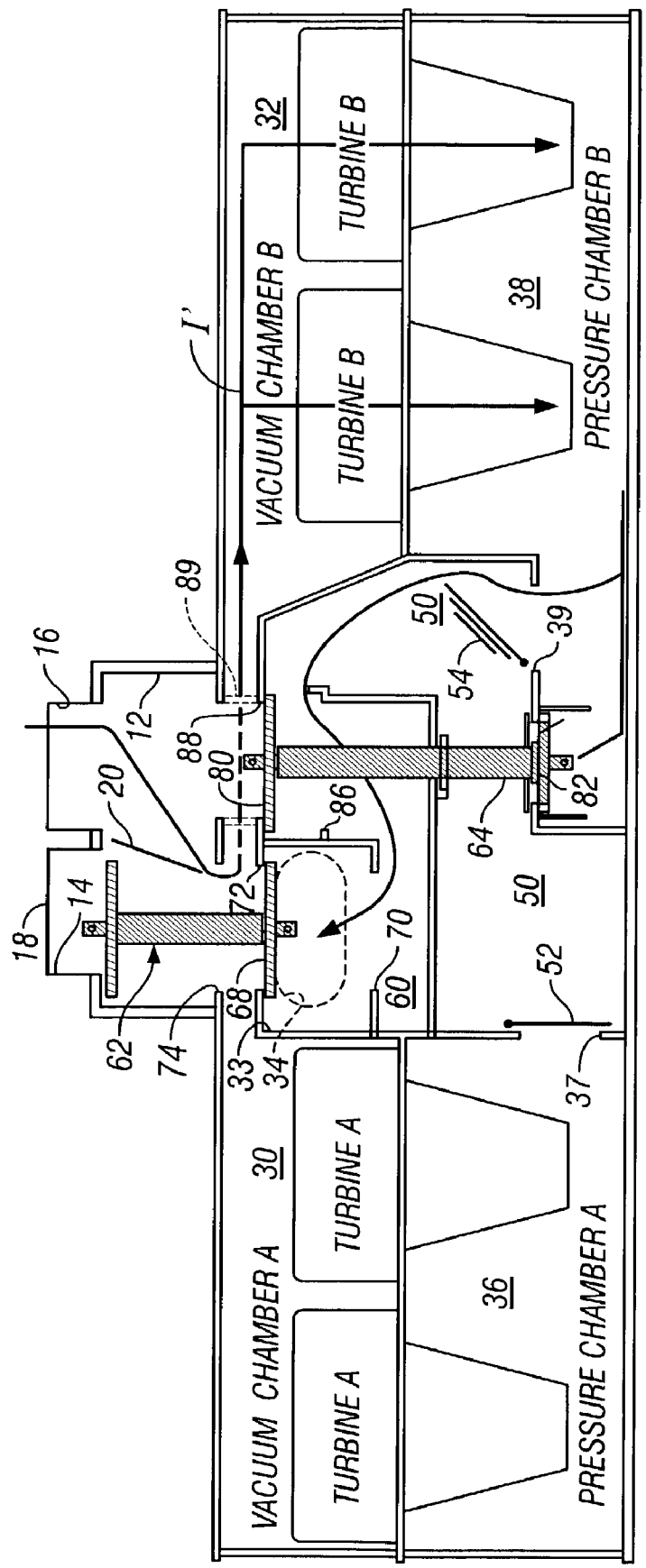
FIG. 5 is a schematic side view, similar to FIG. 2, of the multi-stage pressure supply apparatus in a second vacuum forming stage.
Figure 6:
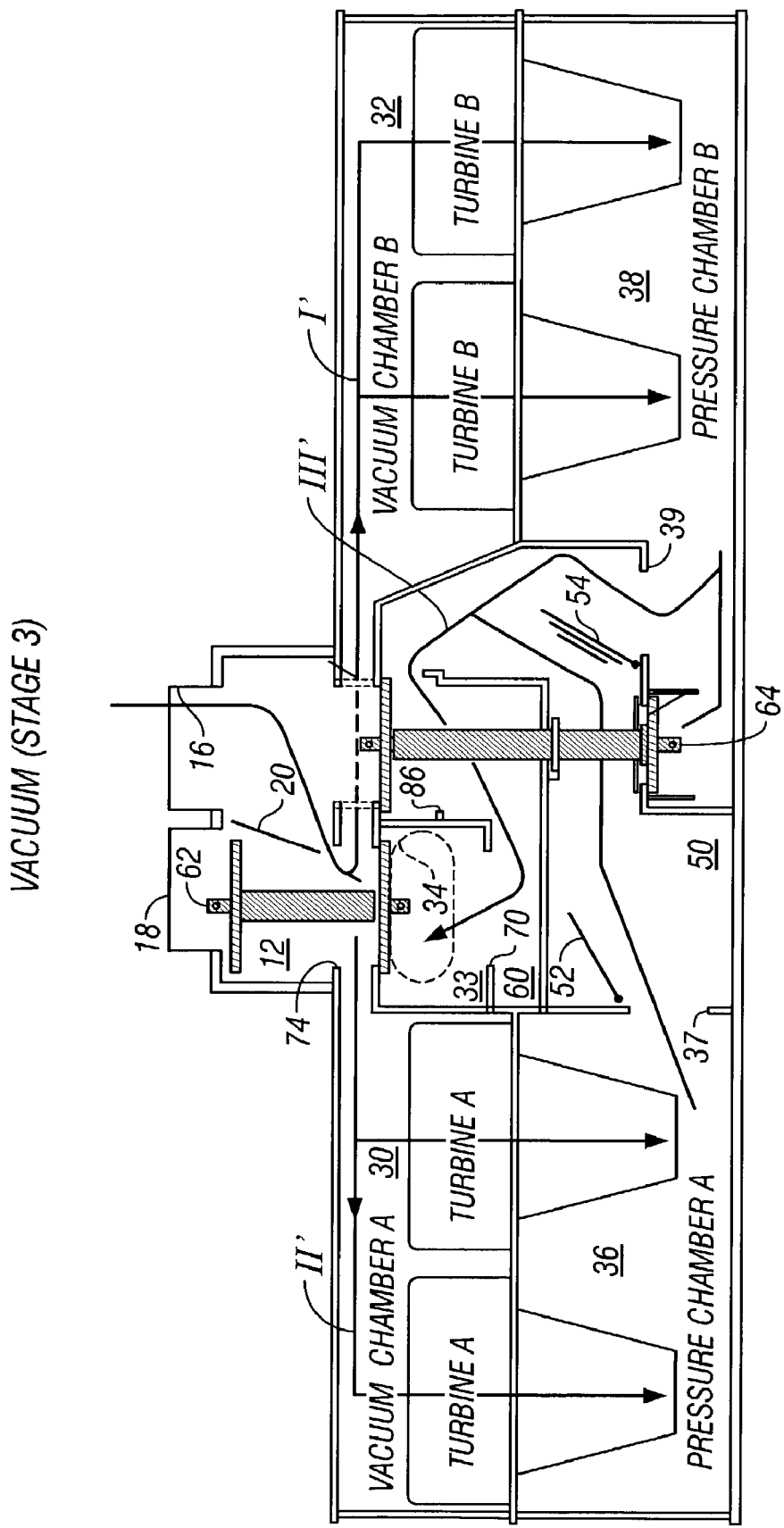
FIG. 6 is a schematic side view, similar to FIG. 2, of the multi-stage pressure supply apparatus in a third vacuum forming stage.

FIGS. 2–6 show the same schematic, cut-away side view of apparatus 10 and include arrows demonstrating air flow patterns through the apparatus to create pressure and vacuum conditions within an interfaced external network such as carrier tube network 118 shown in FIG. 1. Specifically, FIGS. 2 and 3 demonstrate two stages of pressure creation by apparatus 10, while FIGS. 4–6 show three stages of vacuum creation. Reference now will be made to FIG. 2 in detail to discuss the elements and assemblies of apparatus 10, while explaining first stage pressure generation at length.

Apparatus 10 has a generally rectangular housing 11 that defines an external connection chamber 12 adapted to interface with a tube network or the like to be supplied with pressurized air. External connection chamber 12 is shown with a pressure hose connector port 14 and a vacuum hose connector port 16. Pressure hose port 14 is closeable by a vacuum check valve 18, and similarly, vacuum hose connector port 16 is sealable by a pressure check valve 20. As understood from the preferred implementation of apparatus 10, in the absence of internally or externally generated pressure conditions, vacuum check valve 18 simply will close due to gravity while pressure check valve 20 will open under force of gravity. As apparent to those of ordinary skill, alternative valve devices controlled not merely in response to pressure and gravity freely could be substituted for check valves 18 and 20.

On the left-hand side of FIG. 2, housing 11 contains a first turbine pair labelled A and on the right-hand side, a second turbine pair labelled B. Specifically, the turbine pairs A and B, respectively, are housed in a first or A-side turbine chamber 21 and a second or B-side turbine chamber 23. For purposes of discussion, turbine chambers 21, 23 are divided internally such that it will be said that vacuum intake chamber 30 is located above turbine pair A and vacuum intake chamber 32 is located above turbine pair B. The turbines of pair A and pair B discharge into a pressure chamber 36 and a pressure chamber 38 that respectively form the lower portion of each of turbine chambers 21 and 23. Intake chambers 30, 32 are configured to be in permanent communication with each other, and selectively placed in communication with an intake/exhaust chamber 33 having an intake/exhaust port 34 during different stages of operation. Port 34 is in permanent communication with the outside atmosphere. Preferably, each of turbine pair A and turbine pair B has at least one turbine with two turbines being shown in each turbine chamber 21, 23 in the Figures. As will be appreciated, more or less turbines can be included in turbine set/pair A and turbine set/pair B. Also, it will become clear that, depending on how the various valve elements are biased, it may not be necessary to have the same number of turbines on each side of common pressure chamber 50, or alternatively, turbines of different air movement capability. Further, it will be apparent to those of ordinary skill that various types of air driving apparatus can be used in place of the turbines called for in the disclosed embodiment.

Apparatus 10 features a common pressure chamber 50 intermediate between the turbine pairs that selectively receives air discharged from the turbines through either or both of turbine pressure chambers 36 and 38. Apparatus 10 employs an unbiased (in the preferred embodiment unweighted) check valve 52 to selectively isolate turbine pressure chamber 36 from the common pressure chamber 50 through a port 37. On the other hand, a biased, herein weighted, check valve 54 selectively opens or closes communication between turbine pressure chamber 38 and common pressure chamber 50 through a port 39. While the bias for valve 54 derives from weight and gravity in the preferred embodiment, it is contemplated that such could be created by other mechanical or electrical-mechanical means as well. Also, while valve 52 is depicted as disposed to be oriented primarily vertically when closed over port 37, and valve 54 is depicted as disposed to be oriented primarily horizontally when closed over port 39, other arrangements for the valves will be apparent.

Housing 11 also defines a valve connection chamber 60 regulated by two spool valves 62 and 64 that each have respective upper and lower operational positions. Vacuum spool valve 62 has disks 66 and 68. Disk 68 toggles between two ports 70 and 72 of intake/exhaust chamber 33, while disk 66 toggles between closure of a port 74 and a removed upper position. When not closed by disk 66, port 74 puts the external connection chamber 12 in communication with the intake/exhaust chamber 33 as well as each of connected turbine vacuum chambers 30, 32. Differential spool valve 64, on the other hand, has closure disks 80 and 82 wherein disk 82 toggles to selectively close a port 84 between turbine pressure chamber 38 and the common pressure chamber 50, and wherein disk 80 toggles between ports 86 and 88 to open or close these ports. Ports 86 and 88 can be regarded as exit ports from the common pressure chamber 50 in that they lead to valve connection chamber 60 and external connection chamber 12, respectively. It is to be understood that port 88 actually leads into a tubular structure 89 connecting common pressure chamber 50 with external connection chamber 12. Tube 89 is sized so as to not prevent communication between turbine vacuum chambers 30, 32.

As seen, the lower portion of differential spool valve 64 is received in a cylindrical assembly 90 that, in turn, is located within the B-side turbine pressure chamber 38. Assembly 90 guides disk 82 as valve 64 moves between port 84 at the upper portion of the assembly and back. An upper flexible seal disk 100 is disposed around spool valve 64 and seals spool valve 64 against the exterior valve seat walls between common pressure chamber 50 and valve connection chamber 60. This prevents pressure leakage into the valve connection chamber 60. when the common pressure chamber becomes pressurized. Similarly, a lower flexible seal disk 102 is disposed around spool valve 64 and seals the spool against the valve seat walls above assembly 90 to prevent leakage from common chamber 50, when pressurized, into turbine chamber 38.

Operation of apparatus 10 and specifically the air flow process through the five distinct stages of the apparatus of the present invention now will be described. FIGS. 2 and 3 together show a two-stage pressurization procedure. We begin the operation description with primary reference again to FIG. 2. The early stage of the pressurization process is illustrated in FIG. 2 when the turbines of turbine pair A are activated. Turbines A draw in intake air indicated by arrow I from intake/exhaust port 34, through intake/exhaust chamber 33, and through turbine vacuum chamber 30 into the air intake side of each turbine. Turbine pressure chamber 36 becomes pressurized by air discharged by the activated turbine pair A. Pressure force in chamber 36 opens unweighted check valve 52 and communication with common pressure chamber 50 through port 37 whereupon air flow pattern I is established through the common pressure chamber and the connection tube 89, into external connection chamber 12.

Increased pressure in connection chamber 12 opens vacuum check valve 18 while holding pressure check valve 20 closed. Increased pressure in common pressure chamber 50 meanwhile upwardly forces seal disk 100 against the interior walls of the common pressure chamber to form the seal ensuring isolation between valve connection chamber 60 and the common pressure chamber. Likewise, high pressure forces seal disk 102 downwardly over port 84 to form a seal isolating assembly 90 from the common pressure chamber 50. Sealing occurs as disks 100 and 102 flex under pressure force as air flow I continues through common pressure chamber 50, and through port 88 into external connection chamber 12 to exit at port 14.

On the other hand, there is no passage for air flow into valve connection chamber 60 from common pressure chamber 50. This is because high pressure in chamber 50 also exerts downward force on differential spool valve disk 80 to hold the disk over port 86. Air pressure created in external connection chamber 12 due to flow I forces pressure check valve 20 closed as mentioned above, but also at the same time, forces disk 66 of vacuum spool valve 62 downwardly over port 74. This prevents pressure escape through intake/exhaust port 34. In the configuration described, common pressure chamber 50 effectively is isolated from vacuum hose connection port 16, and by turbine pair A, from intake/exhaust port 34.

FIG. 3 illustrates the second pressurization stage after the initial pressure stage described above in connection with FIG. 2. The pressurization stage of FIG. 3 begins by activating at least one of the turbines of set or pair B, preferably about one second after the turbines of pair A have been activated. Turbines B likewise receive intake from intake/exhaust port 34. The intake air follows a second flow pattern II through open port 72, around connection tube 89, into vacuum chamber 32 for the B turbines, to be received by the intake side of the B turbines.

Air driven from turbine set B is discharged into pressure chamber 38 where it accumulates while weighted check valve 54 is closed. Immediately, pressurized air accumulating in chamber 38 also begins to act against disk 82 in a direction tending to lift differential spool valve 64. However, in the preferred embodiment, spool valve 64 will not be lifted by the upward force of turbine B pressure against disk 82 because the pressure of air flow pattern I created by turbine pair A through common pressure chamber 50 exerts downward force against disk 80 in an opposing fashion. As explained above, in preferred apparatus 10, downward force by turbines A against disk 80 is relatively greater than the upward force by turbines B against disk 82 because the disks are configured so that the surface area diameter of disk 80 is about at least twice the surface area diameter of disk 82. Thus, pressure created by turbines B increases in chamber 38 until it overcomes weighted valve 54 to open the valve and likewise discharge pressurized air into the common pressure chamber 50 through port 39 to combine with air flow pattern I established by turbines A. This is indicated by air stream III. This combined pressurized air flow passes through port 88, external chamber 12 and exits at pressure hose connection port 14 to drive, for example, a bi-directional pneumatic item delivery system as discussed above. Operated in this way, apparatus 10 produces a maximum air pressure supply with all turbines (both A-side and B-side) operating. Also, however, it is contemplated here that should less than maximum pressure be needed, less than all turbines could be activated, as desired. What is necessary in the disclosed embodiment is that the A-side turbines (or turbine) be activated first in order to establish air flow pattern I, whereafter the B-side turbines (or turbine) are/is activated to add supplementary air flow pattern II.

Description now is made of the three vacuum stages according to the present invention. Reference is made first to FIG. 4 for the initial vacuum stage. When at rest (turbines inactive), apparatus 10 will be understood to have vacuum check valve 18 falling closed and pressure check valve 20 falling open. When apparatus 10 is to generate vacuum conditions in a hose or the like interfaced at vacuum connector port 16, turbines B are started first. At this time, the B turbines draw in air from intake/exhaust port 34. Intake air, identified by arrow I', flows through port 72, around connection tube 89, into the B-side vacuum chamber 32, and to the intake of the B turbines. The B turbines likewise discharge into pressure chamber 38 and so pressure in chamber 38 acts with upward tending force on check valve 54. However, preferred check valve 54 is weighted so that it will not open at this stage. Instead, the pressure building in chamber 38 now exerts sufficient upward force upon disk 82 to raise differential spool valve 64 to the spool valve's upper position. In this position, spool valve disk 82 closes over port 84 and spool valve disk 80 closes off port 88 and opens port 86 below. Unlike the pressurization stages, during this first vacuum stage there is no pre-existing turbine-generated high pressure in common pressure chamber 50 to act against larger diameter disk 80 and resist upward movement of differential valve 64. In preferred apparatus 10, therefore, spool valve 64 and check valve 54 are weighted such that during this first vacuum stage, pressure created in chamber 38 by the B-side turbines will lift spool valve 64 before it will be sufficient to open weighted check valve 54. With differential spool valve 64 in its upper position and weighted check valve 54 closed, air cannot yet escape from pressure chamber 38 and accumulates there. This completes the first stage of vacuum creation.

FIG. 5 illustrates the second vacuum stage. The increasing pressure in chamber 38 soon overcomes the bias to open check valve 54 and thereby pressurize common pressure chamber 50 through port 39. At the same time, pressure introduced into chamber 50 holds check valve 52 tight against port 37 to hold this port closed. Closing of check valve 52 ensures that pressure created by turbines B will not enter A-side pressure chamber 36 and cause reverse turbine rotation and/or over current conditions at the time the A-side turbines are activated.

As stated above, when differential valve 64 assumes its upper position, its disk 80 covers port 88. This blocks air flow from common pressure chamber 50 into connection tube 89 and directs it into valve connection chamber 60 through port 86 where it contacts vacuum spool valve 62, namely at disk 68 thereof resting over port 70. Now the pressure introduced into chamber 60 raises vacuum spool valve 62 to open port 70. As vacuum spool valve 62 is raised to its upper position, note that the air intake for turbines B automatically switches from air drawn in through intake/exhaust port 34 to air drawn in from the vacuum connector port 16 through open pressure check valve 20. Intake/exhaust port 34 then, at the same time, switches to become the vent for pressurized air entering intake/exhaust chamber 33 from valve connection chamber 60. Henceforth, air is now sucked in through vacuum connection port 16 to create vacuum conditions in whatever external apparatus is interfaced with that port. This sucked-in air proceeds through port 74, around connection tube 89 and into vacuum chamber 32, as the feed I' for the B turbines. Pressure created in valve connection chamber 60 and intake/exhaust chamber 33 by the air stream I' rushing out through port 34 holds disk 68 of vacuum spool valve 62 in its upper position away from port 70 and against port 72. This maintains isolation of chamber 33 from the external connection chamber 12 and turbine vacuum chambers 30, 32.

FIG. 6 illustrates the third and final vacuum stage. After a delay of again, preferably about one second, turbine set A is activated to work in combination with turbines B. Intake air for turbines A likewise is drawn in from vacuum connection port 16 through external connection chamber 12, port 74 and turbine vacuum chamber 30. Activation of the A turbines pressurizes their chamber 36 and this pressure increases until it overcomes the pressure of air flow pattern I' established by turbines B through the common chamber 50 to open check valve 52 and establish a second vacuum condition air flow pattern II'. Common pressure chamber 50 now receives the combined pressurized air flow of both of turbine sets A and B. The combined pressurized air flow pattern III' continues, as in FIG. 6, through open port 86, valve connection chamber 60, port 70 and out through intake/exhaust port 34 of intake/exhaust chamber 33 to the atmosphere. In this way the capacity of both of turbine sets A and B again can be combined to supply an external item delivery system or the like with a powerful vacuum source by way of port 16.

It is understood that there can be various changes and modifications to the preferred embodiments of the present invention disclosed herein. For instance, alternative valve structures for differential spool valve 64 and vacuum spool valve 62 will be apparent to those of ordinary skill in the art. Likewise, as mentioned earlier in connection with check valves 18 and 20, alternative valve mechanisms for other check valves disclosed herein such as check valves 52 and 54 will be apparent. However, all such changes and/or modifications which may be made by one of ordinary skill in the art, still would result in an apparatus and composite system well within the scope of the invention as set forth in the claims.

What is claimed is:

1. A multi-stage pressure generation apparatus comprising:
    a housing, said housing defining in its interior
        an external connection chamber having a vacuum input port and a pressure output port, said vacuum input port and said pressure output port being adapted for connection to external apparatus,
        a common pressure chamber,
        a first turbine chamber communicable with said common pressure chamber, and
        a second turbine chamber communicable with said common pressure chamber;
    a first turbine housed within said first turbine chamber;
    a second turbine housed within said second turbine chamber;
    a first valve means; and
    a second valve means, said first and second valve means regulating communication between said first turbine chamber and said common pressure chamber and between said second turbine chamber and said common pressure chamber respectively such that activation of one of said first and second turbines before the other of said turbines causes said generation apparatus to create one of pressure and vacuum conditions at said external connection chamber.

2. A bi-directional pneumatic conveyance system comprising:
  a carrier tube network; and
  a multi-stage pressure generation apparatus for controlling pressure and vacuum conditions in said tube network, said apparatus comprising:
  a housing, said housing defining in its interior
    an external connection chamber having a vacuum input port and a pressure output port, said vacuum input port and said pressure output port being adapted for connection to external apparatus,
    a common pressure chamber,
    a first turbine chamber communicable with said common pressure chamber, and
    a second turbine chamber communicable with said common pressure chamber;
  a first turbine housed within said first turbine chamber,
  a second turbine housed within said second turbine chamber;
  a first valve means; and
  a second valve means, said first and second valve means regulating communication between said first turbine chamber and said common pressure chamber and between said second turbine chamber and said common pressure chamber respectively such that activation of one of said first and second turbines before the other of said turbines causes said generation apparatus to create one of pressure and vacuum conditions at said external connection chamber.

3. An apparatus as claimed in claim 1 or 2, wherein
  said first valve means includes a first valve providing communication between said first turbine chamber and said common pressure chamber in response to a first pressure in said first turbine chamber,
  said second valve means includes a second valve providing communication between said second turbine chamber and said common pressure chamber in response to a second pressure in said second turbine chamber, and
  said second pressure is greater than said first pressure.

4. An apparatus as claimed in claim 3,
  wherein said housing further defines an intake/exhaust chamber having an intake/exhaust port in free communication with external atmosphere, and a valve connection chamber that connects said common pressure chamber with said intake/exhaust chamber, and
  wherein said apparatus further comprises differential valve means for regulating communication between said common pressure chamber and said valve connection chamber in response to pressure in said common pressure chamber and pressure in said second turbine chamber.

5. An apparatus as claimed in claim 4, further comprising vacuum valve means for regulating communication between said intake/exhaust chamber and said external connection chamber and between said intake/exhaust chamber and said valve connection chamber in response to pressure or vacuum in said external connection chamber and pressure in said valve connection chamber.

6. An apparatus as claimed in claim 5, wherein
  said differential valve means includes a spool valve having a first valve disk and a second valve disk, said second valve disk alternatively closing and opening a port connecting said common pressure chamber and said external connection chamber, and a port connecting said common pressure chamber and said valve connection chamber in response to relative force exerted against said first valve disk thereof by pressure in said second turbine chamber and exerted against said second valve disk thereof by pressure in said common pressure chamber; and
  said vacuum valve means includes a spool valve having a first valve disk alternatively opening and closing a port connecting said valve connection chamber and said intake/exhaust chamber and a second valve disk alternatively opening and closing a port connecting said intake/exhaust chamber and said external connection chamber in response to relative force exerted against said first valve disk thereof by pressure in said valve connection chamber and exerted against said second valve disk thereof by pressure in said external connection chamber.

7. An apparatus as claimed in claim 6, wherein said second valve disk of said differential spool valve has a surface area relatively greater than a surface area of said first valve disk thereof.

8. An apparatus as claimed in claim 7, wherein said surface area of said second valve disk is about twice as large as said surface area of said first valve disk.

9. An apparatus as claimed in claim 7, wherein said differential spool valve and said vacuum spool valve are oriented so as to be positioned by gravity unless air pressure within said housing changes positions of said spool valves.

10. An apparatus as claimed in claim 9, wherein
  said first valve is located at a port between said first turbine chamber and said common pressure chamber and is closeable by gravity; and
  said second valve is located at a port between said second turbine chamber and said common pressure chamber and is closeable by gravity.

11. An apparatus as claimed in claim 10, wherein each of said turbine chambers has a vacuum side at an air intake of said turbine in each of said chambers and a pressure side at an air discharge of said turbine, said vacuum side of each of said first and second turbine chambers being in permanent communication and said port associated with said first valve being between said pressure side of said first turbine chamber and said common pressure chamber and said port associated with said second valve being between said pressure side of said second turbine chamber and said common pressure chamber.

12. An apparatus as claimed in claim 11, wherein
  said first valve is a check valve oriented substantially vertically when closed; and
  said second valve is a check valve oriented substantially horizontally when closed.

13. An apparatus as claimed in claim 1 or 2, wherein said spool valve of said differential valve means includes seal disks.

14. An apparatus as claimed in claim 1 or 2, wherein said external connection chamber includes a valve at said vacuum input port that is openable by pressure in said external connection chamber, and a valve at said pressure output port that is openable by gravity.

15. An apparatus as claimed in claim 1 or 2, further comprising plural turbines housed in each of said first and second turbine chambers.

* * * * *